United States Patent [19]

Zander

[11] Patent Number: 5,544,833
[45] Date of Patent: Aug. 13, 1996

[54] FILM ROLL ACCUMULATING DEVICE

[75] Inventor: Dennis R. Zander, Penfield, N.Y.

[73] Assignee: Eastman Kodak Company, Rochester, N.Y.

[21] Appl. No.: 391,757

[22] Filed: Feb. 21, 1995

[51] Int. Cl.$^6$ .................................................. G03B 23/02
[52] U.S. Cl. .......................................... 242/348; 354/275
[58] Field of Search ........................... 242/348, 348.1, 242/348.2, 348.3, 348.4, 332.7, 332.8, 358, 358.1, 535.1; 354/214, 275

[56] References Cited

U.S. PATENT DOCUMENTS

| | | | |
|---|---|---|---|
| 1,799,184 | 4/1931 | Slocum et al. | 242/348.4 |
| 2,236,917 | 4/1941 | Pollock | 242/348.4 |
| 3,057,573 | 10/1962 | Kindig et al. | |
| 3,288,388 | 11/1966 | Winkler | 242/348.1 |
| 3,356,311 | 12/1967 | Winkler et al. | 242/348.1 |
| 3,718,301 | 2/1973 | Morton . | |
| 3,823,891 | 7/1974 | Schrader . | |
| 4,077,128 | 3/1978 | Stoutenberg | 33/138 |

OTHER PUBLICATIONS

The Focal Encyclopedia of Photography Desk Edition, 1969 by Focal Press Ltd., pp. 170–171.

*Primary Examiner*—John M. Jillions
*Attorney, Agent, or Firm*—Roger A. Fields

[57] ABSTRACT

A film roll accumulating device for forming a filmstrip into a cylindrical film roll as for example in a camera or a film cassette, comprises an arcuate film guide at least partially enclosing a cylindrically-shaped space having a centerline. The arcuate film guide includes a film ingress opening through which a filmstrip can be fed to be guided concentrically about the centerline into a cylindrical film roll in the space, and is flexible and secured to permit the film ingress opening to widen to expand the cylindrically-shaped space concentrically about its centerline in order to accommodate enlargement of the cylindrical film roll without any shift in the centerline as additional film is fed through the opening.

7 Claims, 4 Drawing Sheets

FILM ROLL ACCUMULATING DEVICE

FIELD OF THE INVENTION

The invention relates generally to the field of photography, and in particular to a film roll accumulating device for forming a filmstrip into a film roll as for example in a camera or a film cassette.

BACKGROUND OF THE INVENTION

Film roll accumulating devices for forming a filmstrip into a film roll are typically used in the film take-up chamber of a camera or in a film cassette.

As discussed in prior art U.S. Pat. No. 3,057,573, patented Oct. 9, 1962, it is desirable for the film take-up chamber of a camera to be expandable to accommodate enlargement of the film roll as additional film is fed into the take-up chamber. Similarly, it is desirable for the supply chamber of a film cassette to be expandable to accommodate enlargement of the film roll as additional film is fed into the supply chamber.

Prior art U.S. Pat. No. 3,718,301, patented Feb. 27, 1973, discloses a film cassette in which an arcuate pressure shoe is slidably mounted in the cassette housing, and a spring urges the pressure shoe toward a front cover of the cassette housing. When the cartridge housing does not contain any film, the arcuate pressure shoe is relatively close to the front cover. When a filmstrip is first fed into the cartridge housing, the arcuate pressure shoe guides the filmstrip into a film roll having a small inside diameter. The pressure shoe is forced backwardly against the urging of the spring as the outside diameter of the film roll is increased by further feeding the filmstrip into the cartridge housing. Thus, the centerpoint or the center axis of the film roll shifts to accommodate enlargement of the film roll.

SUMMARY OF THE INVENTION

A film roll accumulating device for forming a filmstrip into a cylindrical film roll as for example in a camera or a film cassette, comprising:

an arcuate film guide at least partially enclosing a cylindrically-shaped space having a centerline, including a film ingress opening through which a filmstrip can be fed to be guided concentrically about the centerline into a cylindrical film roll in the space, and being flexible and secured to permit the film ingress opening to widen to expand the cylindrically-shaped space concentrically about its centerline in order to accommodate enlargement of the cylindrical film roll without any shift in the centerline as additional film is fed through the opening.

Preferably, a housing contains the arcuate film guide, and the arcuate film guide has a pair of opposite ends spaced apart to define the film ingress opening and one of the opposite ends is pivotally connected to the housing to secure the arcuate film guide.

Also, the arcuate film guide is not capable of recovering its shape after its film ingress opening is widened to expand the cylindrically-shaped space, and a return spring biases the arcuate film guide to narrow the film ingress opening to contract the cylindrically-shaped space concentrically about its centerline.

An advantage of expanding the cylindrically-shaped space concentrically about its centerline in order to accommodate enlargement of the cylindrical film roll without any shift in the centerline as additional film is added to the film roll is that a battery, a flash capacitor, or other central core can be positioned on-center with the centerline in a central hollow of the film roll in a fixed relation to some corresponding connection point. Since there is no change in the centerline, the fixed relation can be maintained.

DETAILED DESCRIPTION OF THE INVENTION

Figure 1:
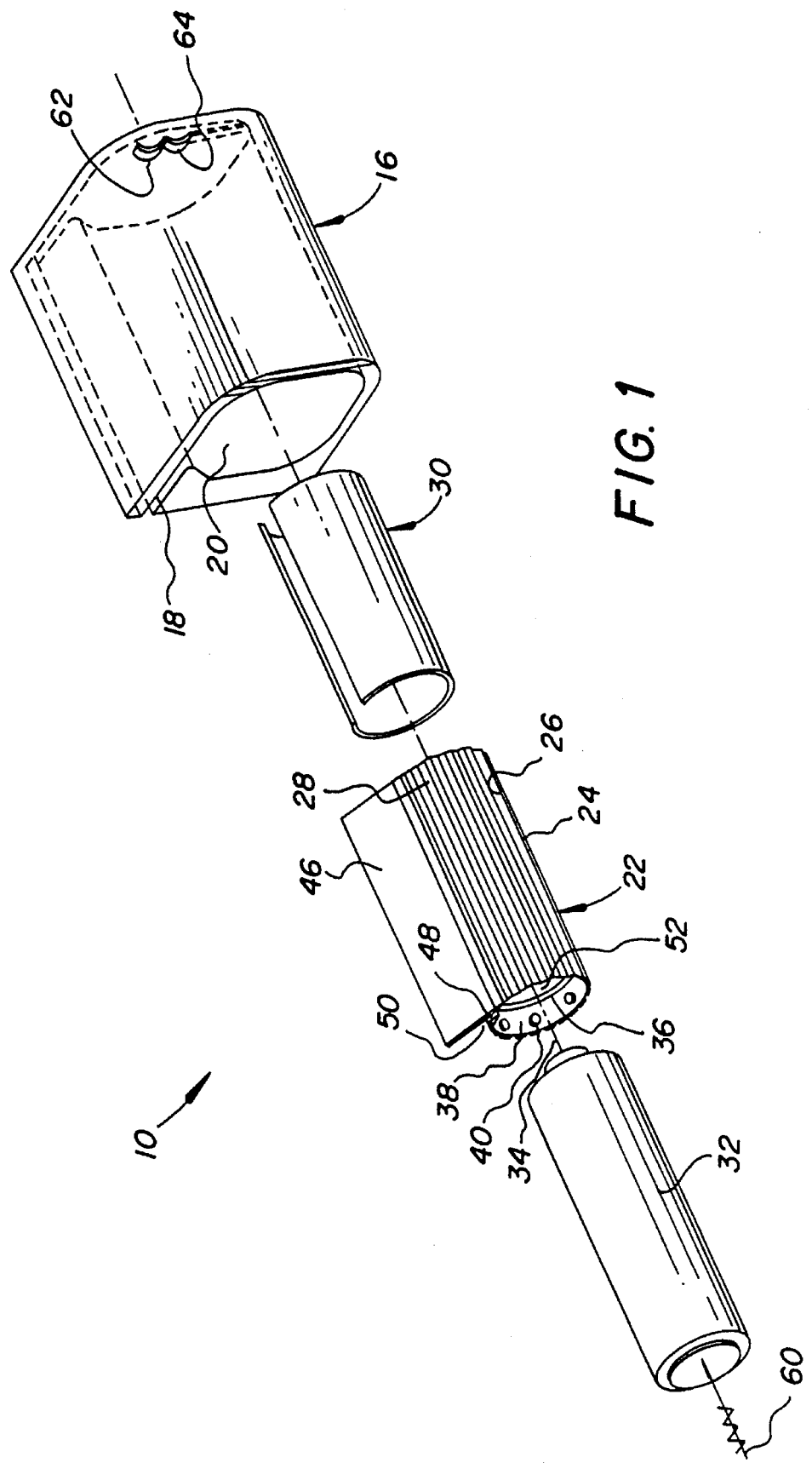
FIG. 1 is an exploded perspective view of a film roll accumulating device according to a preferred embodiment of the invention.
Figure 2:
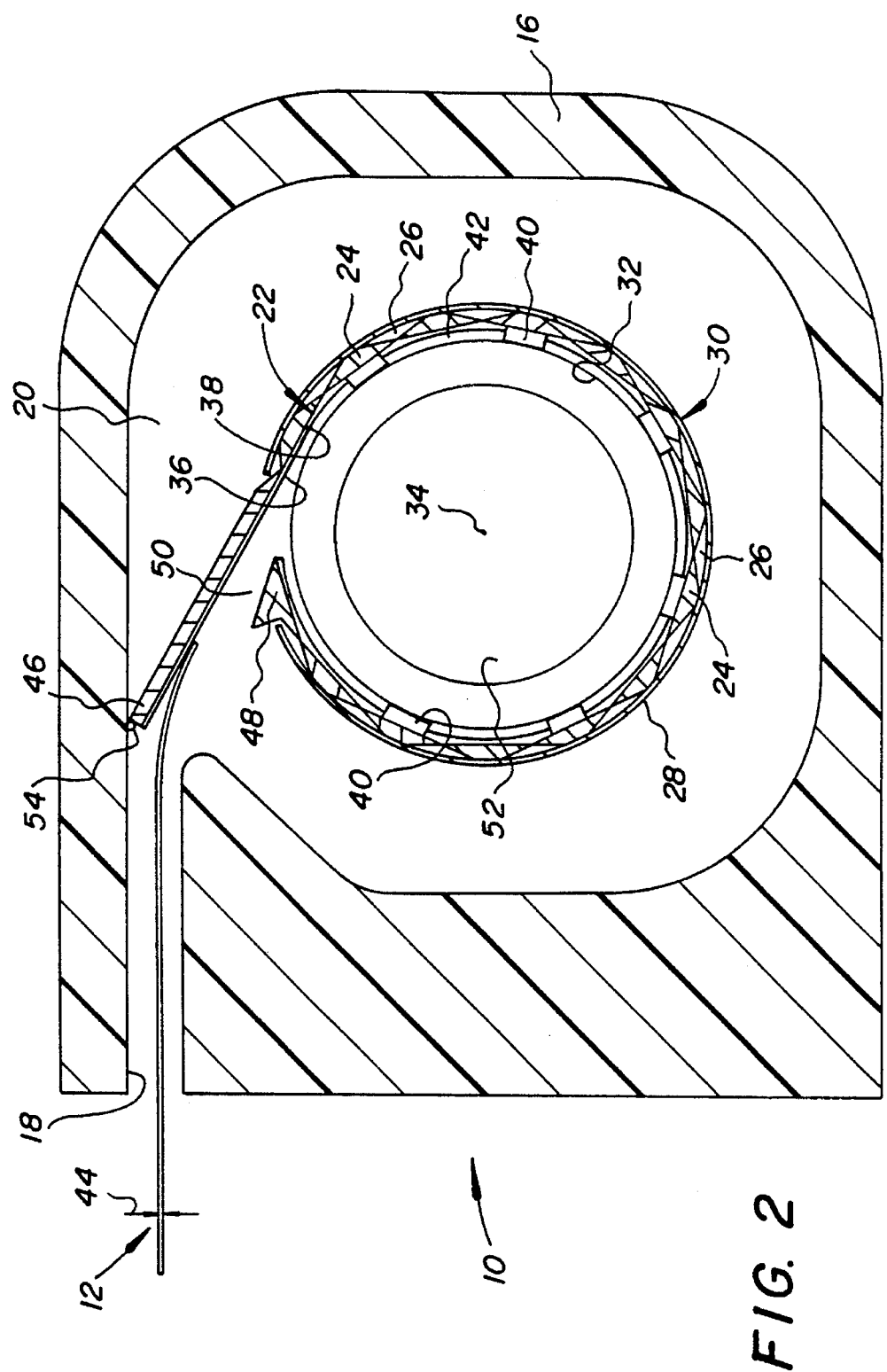
FIGS. 2, 3, and 4 are sectional views of the film roll accumulating device, illustrating successive stages of its operation.
Figure 3:
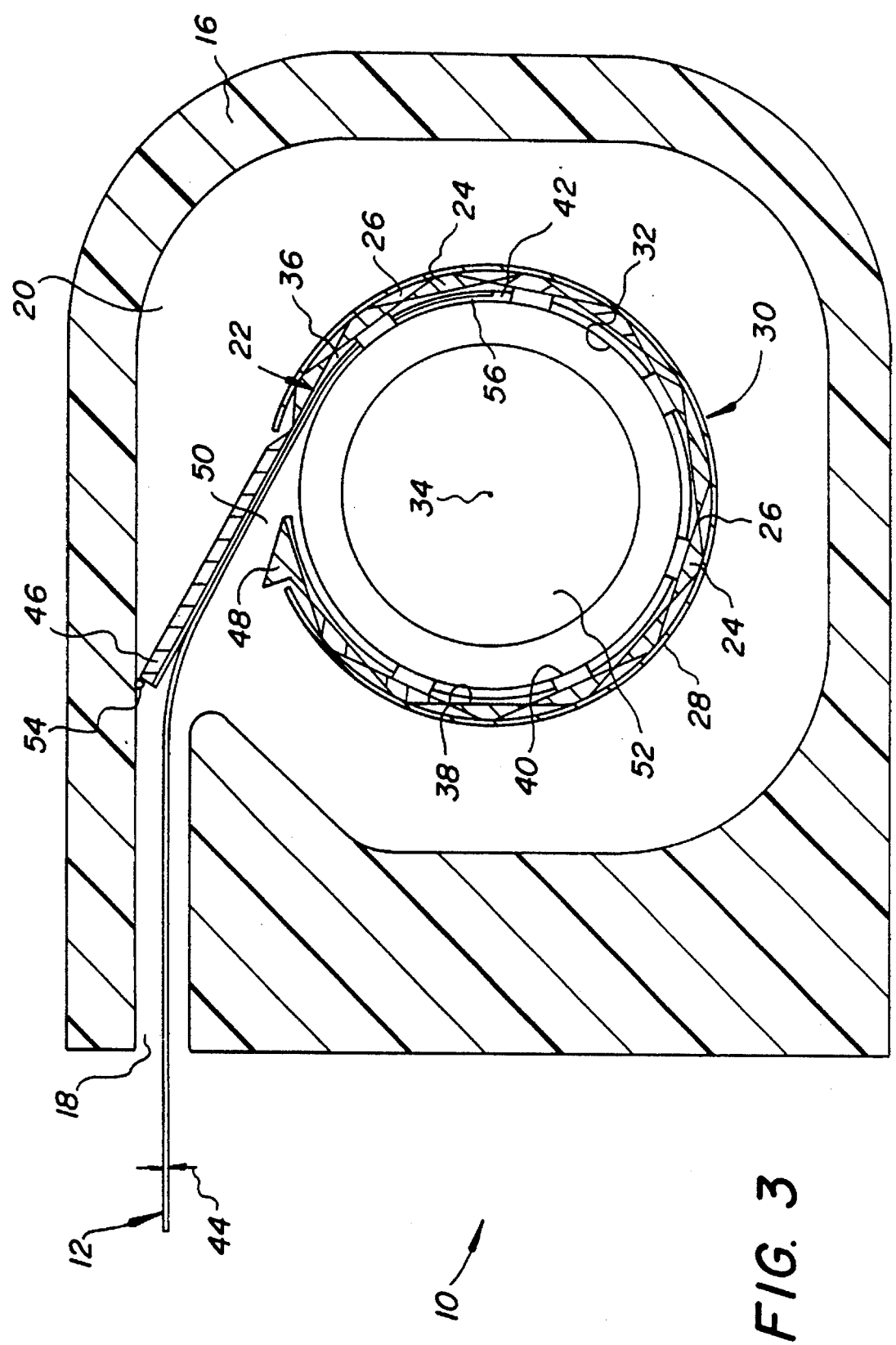

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 depict a film roll accumulating device 10 for forming a filmstrip 12 into a cylindrical film roll 14.

The film roll accumulating device 10 comprises a camera housing portion 16 having a film ingress slot 18 leading to a housing chamber 20, a plastic arcuate film guide 22 having an integral series of alternating ribs 24 and grooves or notches 26 on a convex outer side 28 of the film guide to make the film guide flexible or supple (though not resilient) to permit its expansion, a resilient springy metal arcuate split collar 30, and a cylindrical central core 32. As shown in FIGS. 1–4, the cylindrical central core 32 is located inside the arcuate film guide 22 which, in turn, is located inside the arcuate split collar 30, which, in turn, is located in the housing chamber 20. The cylindrical central core 32, the arcuate film guide 22, the arcuate split collar 30, and the housing chamber 20 all have a common centerline 34.

The arcuate film guide 22 includes two parallel arcuate film support rails or ribs 36 (only one shown) that project from a concave inner side 38 of the film guide for supporting the filmstrip 12 along respective non-imaging edge sections of the filmstrip. Also, the arcuate film guide 22 includes two parallel arcuate series (only one shown) of spacers/film edge guides 40 that project from the concave inner side 38 of the film guide beyond the film support rails 36 to bear against the cylindrical central core 32 to effect an annular gap 42 between the arcuate film rails and the cylindrical central core. The annular gap 42 is at least twice as wide as the thickness 44 of the filmstrip 12 to allow unrestricted film movement along the film rails 36 without the filmstrip contacting the cylindrical central core 32. Also, it assures that the cylindrical film roll 14 begins to form at an inside diameter which is larger than the diameter of the cylindrical central core 32. See FIGS. 2 and 3.

The arcuate film guide 22 has a pair of opposite offset ends 46 and 48 spaced apart to define a film ingress opening 50 through which the filmstrip 12 can be fed from the film ingress slot 18 in the camera housing portion 16 into a cylindrically-shaped space 52 partially enclosed by the arcuate film guide. See FIGS. 1 and 2. The cylindrically-shaped space 52 is concentric with the centerline 34. The end 46 of the arcuate film guide 22 is pivotally connected to the housing portion 16 via a pivot pin or an integral living hinge 54 to continuously support the film guide concentrically about the centerline 34. Conversely, the end 48 of the arcuate film guide 22 is free-floating.

The arcuate split collar 30 is located on the convex outer side 28 of the arcuate film guide 22 to float on the convex outer side concentrically about the centerline 34, to help maintain the arcuate film guide positioned concentrically about the centerline. See FIGS. 2–4.

Operation

When the filmstrip 12 is first fed through the film ingress slot 18 and thence through the film ingress opening 50 into the cylindrically-shaped space 52, it is forced along the two arcuate film support rails 36 and between the two arcuate series of spacers/film edge guides 40, and along the annular gap 42, without contacting the cylindrical central core 32. See FIG. 3. Consequently, the filmstrip 12 is guided concentrically about the centerline 34 to begin to form the cylindrical film roll 14 in the cylindrically-shaped space 52 without contacting the cylindrical central core 32. Since the annular gap 42 is at least twice as wide as the thickness 44 of the filmstrip 12 some portion 56 of the annular gap remains empty, i.e. not occupied by film.

Figure 4:
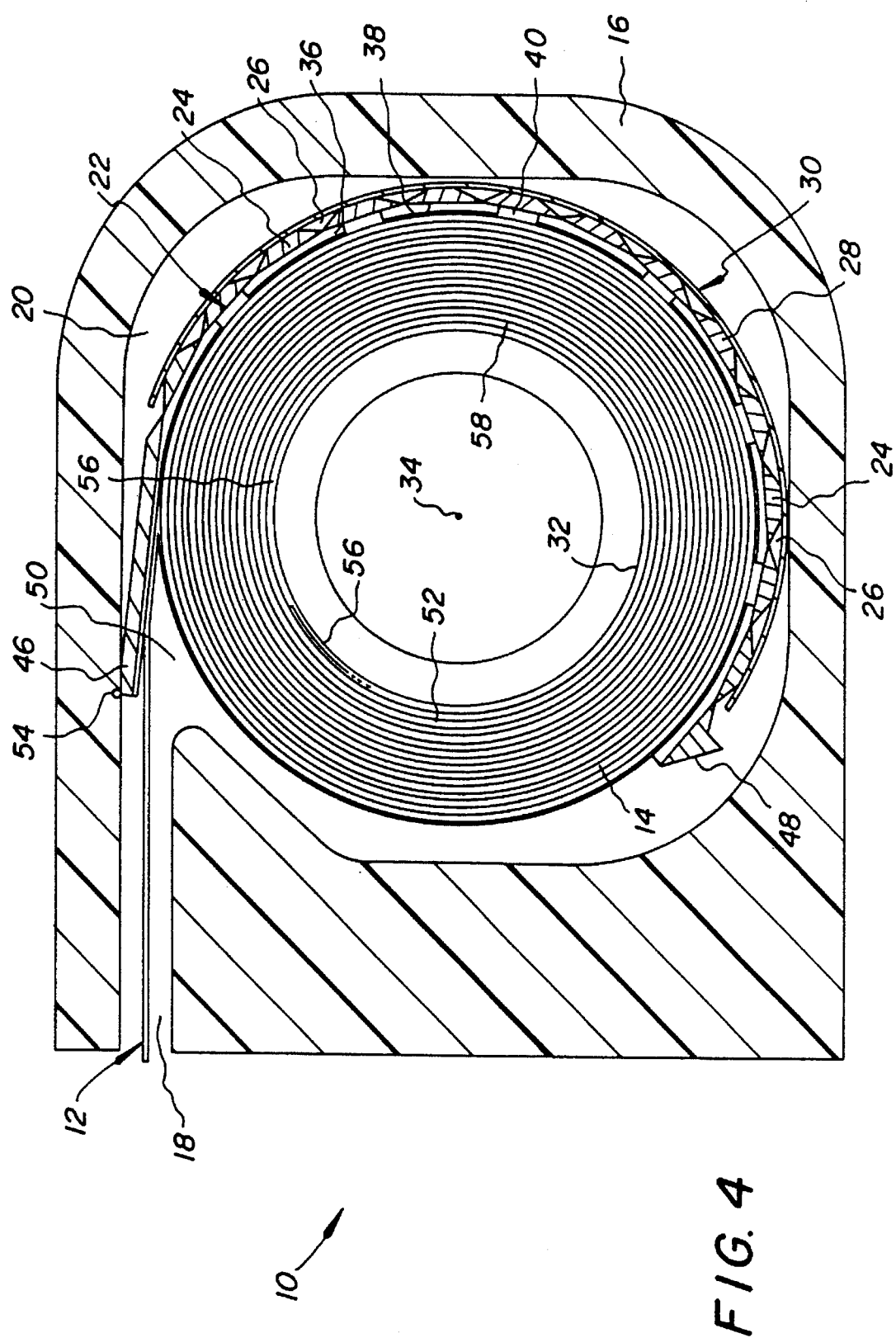

In essence, the inside diameter of the cylindrical film roll 14 does not change as additional film is fed into the cylindrically-shaped space 52 along the arcuate film support rails 36 and the annular gap 42. Instead, as additional film is fed into the cylindrically-shaped space 52 the arcuate film guide 22 is forced to further open at the film ingress opening 50 and to pivot at the pin or living hinge 54 to expand the cylindrically-shaped space concentrically about the centerline 34, permitting only the outside diameter of the cylindrical film roll to increase. Consequently, as shown in FIG. 4, the two arcuate series of spacers 40 separate from the cylindrical central core 32, the empty portion 56 of the annular gap 42 is between an innermost film convolution 58 of the cylindrical film roll 14 and the cylindrical central core, and the cylindrical film roll is progressively enlarged without any shift in the centerline 34, i.e. its initial center axis does not shift. Concurrently, the arcuate split collar 30 continuously weakly biases the arcuate film guide 22 contrary to the stronger expanding force of the cylindrical film roll 14, and since the arcuate split collar is not connected to the housing portion 16 the split collar cannot restrain the arcuate film guide to make it become non-concentric about the centerline 42 as the cylindrical film roll 14 expands.

Preferably the cylindrical central core 32 is a battery urged via a compression spring 60 against a pair of electrical contacts 62 and 64 in the housing chamber 20. Alternatively, the cylindrical central core 32 could be a flash capacitor. Since during formation of the cylindrical film roll 14 there is no shift in the centerline 42 the battery-to-contact connection is not disturbed.

Due to the fact that the innermost film convolution 58 of the cylindrical film roll 14 is spaced from the cylindrical central core 32 as shown in FIG. 4 the filmstrip 12 can readily be pulled out of the cylindrically-shaped space 52 through the film ingress opening 18 without causing the innermost film convolution to cinch on the cylinder central core. As the cylindrically-shaped space 52 is emptied of film, the arcuate split collar 30 returns the arcuate film guide 22 from its expanded condition shown in FIG. 4 to its original contracted condition shown in FIG. 2. Since the arcuate split collar 30 is resilient and the arcuate film guide 22 is only flexible, the arcuate split collar narrows the film ingress opening 50 to contract the cylindrically-shaped space 52 concentrically about the centerline 42.

The invention has been described with reference to a preferred embodiment. However, it will be appreciated that variations and modifications can be effected by a person of ordinary skill in the art without departing from the scope of the invention. For example, instead of the arcuate split collar 30 an elastic band can be provided to resiliently interconnecting the opposite offset ends 46 and 48 of the arcuate film guide 22.

PARTS LIST 10. film roll accumulating device
12. filmstrip
14. cylindrical film roll
16. camera housing portion
18. film ingress slot
20. housing chamber
22. arcuate film guide
24. ribs
26. grooves
28. convex outer side
30. arcuate split collar
32. cylindrical central core
34. common centerline
36. film support rails
38. concave inner side
40. spacers/film edge guides
42. annular gap
44. film thickness
46. film guide end
48. film guide end
50. film ingress opening
52. cylindrically-shaped space
54. pivot pin or living hinge
56. empty gap portion
58. innermost film convolution
60. compression spring
62. electrical contact
64. electrical contact

I claim:

1. A film roll accumulating device for forming a filmstrip into a cylindrical film roll, comprising:

an arcuate film guide at least partially enclosing a cylindrically-shaped space having a centerline, including a film ingress opening through which a filmstrip can be fed to be guided concentrically about the centerline into a cylindrical film roll in the space, and being flexible and secured to permit the film ingress opening to widen to expand the cylindrically-shaped space concentrically about its centerline in order to accommodate enlargement of the cylindrical film roll without any shift in the centerline as additional film is fed through the opening, and not being capable of recovering its shape after its film ingress opening is widened to expand the cylindrically-shaped space; and a return spring biases said arcuate film guide to narrow the film ingress opening to contract the cylindrically-shaped space concentrically about its centerline.

2. A film roll accumulating device as recited in claim 1, wherein a housing contains said arcuate film guide, and said arcuate film guide has a pair of opposite ends spaced apart to define the film ingress opening and one of said opposite ends is pivotally connected to said housing to secure the arcuate film guide.

3. A film roll accumulating device as recited in claim 1, wherein said return spring is a resilient split collar located on a convex outer side of said arcuate film guide to float on said convex outer side concentrically about the centerline.

4. A film roll accumulating device as recited in claim 1, wherein said arcuate film guide includes an arcuate series of spacers projecting from a concave inner side of the arcuate film guide to bear against a central core concentric with the centerline to effect an arcuate gap between said concave inner side and said central core which is wider than the thickness of the filmstrip to allow initial film movement over the concave inner side.

5. A film roll accumulating device as recited in claim 1, wherein said arcuate film guide includes a pair of arcuate film rails projecting from a concave inner side of the arcuate film guide and an arcuate series of spacers projecting from said concave inner side beyond said film rails to bear against a central core concentric with the centerline to effect an arcuate gap between the film rails and said central core which is wider than the thickness of the filmstrip to allow initial film movement along the film rails.

6. A film roll accumulating device as recited in claim 4 or 5, wherein said central core is a battery.

7. A film roll accumulating device for forming a filmstrip into a cylindrical film roll, comprising:

an arcuate film guide at least partially enclosing a cylindrically-shaped space having a centerline, including a film ingress opening through which a filmstrip can be fed to be guided concentrically about the centerline into a cylindrical film roll in the space, and being flexible and secured to permit the film ingress opening to widen to expand the cylindrically-shaped space concentrically about its centerline in order to accommodate enlargement of the cylindrical film roll without any shift in the centerline as additional film is fed through the opening, and including an arcuate series of spacers projecting from a concave inner side of the arcuate film guide to bear against a central core concentric with the centerline to effect an arcuate gap between said concave inner side and said central core which is wider than the thickness of the filmstrip to allow initial film movement over the concave inner side.

\* \* \* \* \*